United States Patent
Park

(10) Patent No.: US 12,380,530 B2
(45) Date of Patent: Aug. 5, 2025

(54) METHOD AND APPARATUS WITH IMAGE PROCESSING

(71) Applicant: SAMSUNG ELECTRONICS CO., LTD., Suwon-si (KR)

(72) Inventor: Juyong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/829,928

(22) Filed: Jun. 1, 2022

(65) Prior Publication Data
US 2023/0127476 A1    Apr. 27, 2023

(30) Foreign Application Priority Data
Oct. 26, 2021  (KR) .................. 10-2021-0143732

(51) Int. Cl.
| | |
|---|---|
| G06T 3/18 | (2024.01) |
| G06T 3/4038 | (2024.01) |
| G06T 5/50 | (2006.01) |
| G06T 7/00 | (2017.01) |
| G06T 7/10 | (2017.01) |
| G06T 7/11 | (2017.01) |
| G06T 7/33 | (2017.01) |

(52) U.S. Cl.
CPC ............ *G06T 3/18* (2024.01); *G06T 7/10* (2017.01); *G06T 7/97* (2017.01)

(58) Field of Classification Search
CPC .... G06T 3/18; G06T 7/10; G06T 7/97; G06T 3/4038; G06T 7/33; G06T 5/50; G06T 7/11; G06T 2207/20221; G06F 18/22; H04N 23/695
See application file for complete search history.

(56) References Cited

U.S. PATENT DOCUMENTS

| | | |
|---|---|---|
| 7,009,652 B1 | 3/2006 | Tanida et al. |
| 7,412,107 B2 | 8/2008 | Milanfar et al. |
| 7,724,439 B2 | 5/2010 | Li et al. |
| 7,940,282 B2 | 5/2011 | Milanfar et al. |
| 8,237,841 B2 | 8/2012 | Tanida et al. |

(Continued)

FOREIGN PATENT DOCUMENTS

| | | |
|---|---|---|
| KR | 10-1524548 B1 | 6/2015 |
| KR | 10-2019-0060441 A | 6/2019 |

(Continued)

*Primary Examiner* — Stephen R Koziol
*Assistant Examiner* — Joshua Chen
(74) *Attorney, Agent, or Firm* — NSIP Law

(57) ABSTRACT

An electronic device may include: a camera module comprising a wide angle camera configured to generate a wide image and a telephoto camera configured to generate teleimages corresponding to grid cells of the wide image; and one or more processors configured to: partition the teleimages into partial teleimages; determine partial wide images corresponding to the partial teleimages based on subcells of the grid cells and the wide image; perform feature matching between the partial teleimages and the partial wide images; determine a warping parameter of the teleimages based on a result of the feature matching; and generate a synthetic image corresponding to the wide image by warping the teleimages based on the warping parameter.

25 Claims, 11 Drawing Sheets

(56) References Cited

U.S. PATENT DOCUMENTS

| | | |
|---|---|---|
| 8,554,014 B2 | 10/2013 | Levy et al. |
| 8,947,502 B2 | 2/2015 | Mashiah |
| 9,185,291 B1 | 11/2015 | Shabtay et al. |
| 9,485,397 B2 | 11/2016 | Rudmann et al. |
| 10,142,549 B2 | 11/2018 | Wang |
| 10,187,627 B2 | 1/2019 | Cho et al. |
| 10,290,111 B2 * | 5/2019 | Jia ............................. G06T 3/18 |
| 10,666,862 B2 | 5/2020 | Thurow et al. |
| 10,805,534 B2 | 10/2020 | Noh et al. |
| 10,963,989 B2 | 3/2021 | Jung et al. |
| 10,972,672 B2 | 4/2021 | Zhen et al. |
| 11,715,178 B2 * | 8/2023 | Cho ......................... G06T 5/77 |
| | | 382/284 |
| 2001/0005433 A1 * | 6/2001 | Takiguchi ............... G06T 11/60 |
| | | 382/282 |
| 2005/0226531 A1 * | 10/2005 | Silverstein ................ G06T 3/00 |
| | | 382/284 |
| 2011/0052015 A1 * | 3/2011 | Saund ....................... G06T 7/33 |
| | | 345/671 |
| 2014/0204234 A1 * | 7/2014 | Nonaka ................... H04N 23/69 |
| | | 348/222.1 |
| 2017/0078568 A1 | 3/2017 | Venkataraman et al. |
| 2017/0111558 A1 | 4/2017 | Brueckner et al. |
| 2018/0096487 A1 * | 4/2018 | Nash ...................... H04N 23/45 |
| 2020/0184673 A1 * | 6/2020 | Hsieh ..................... G06T 7/136 |

FOREIGN PATENT DOCUMENTS

| | | |
|---|---|---|
| KR | 10-2110136 B1 | 5/2020 |
| KR | 10-2020-0116844 A | 10/2020 |
| KR | 10-2195279 B1 * | 12/2020 |
| KR | 10-2021-0051242 A | 5/2021 |
| KR | 10-2021-0081767 A | 7/2021 |

* cited by examiner

Wide image 510

Teleimages 520

METHOD AND APPARATUS WITH IMAGE PROCESSING

CROSS-REFERENCE TO RELATED APPLICATIONS

This application claims the benefit under 35 USC § 119(a) of Korean Patent Application No. 10-2021-0143732, filed on Oct. 26, 2021 in the Korean Intellectual Property Office, the entire disclosure of which is incorporated herein by reference for all purposes.

BACKGROUND

1. Field

The following description relates to a method and apparatus with image processing.

2. Description of Related Art

To generate (for example, a panoramic capture) one image by concatenating various images, the various images may be concatenated with reference to a corresponding feature. The corresponding feature may be obtained by feature matching. The feature matching may match a similar feature by comparing features of two different images. A warp between the images may be improved by image warping. The image warping may match pixel coordinates of an original image to pixel coordinates of a target image through geometric transformation. For example, in response to two images of a same scene being captured from different capturing angles, the two images may be converted into a corresponding image by image warping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes: a camera module comprising a wide angle camera configured to generate a wide image and a telephoto camera configured to generate teleimages corresponding to grid cells of the wide image; and one or more processors configured to: partition the teleimages into partial teleimages; determine partial wide images corresponding to the partial teleimages based on subcells of the grid cells and the wide image; perform feature matching between the partial teleimages and the partial wide images; determine a warping parameter of the teleimages based on a result of the feature matching; and generate a synthetic image corresponding to the wide image by warping the teleimages based on the warping parameter.

For the generating of the teleimages, the telephoto camera may be configured to generate the teleimages by changing a capture direction according to preset directions based on a relationship between a capture area of the telephoto camera and a capture area of the wide angle camera.

For the performing of the feature matching, the one or more processor may be configured to: generate primary warping results by applying an initial warping parameter to the partial teleimages; and perform the feature matching between the primary warping results and the partial wide images.

The one or more processor may be configured to: for the determining of the warping parameter, determine an improved warping parameter of the teleimages according to a result of the feature matching based on the primary warping results; and for the generating of the synthetic image, generate secondary warping results by applying the improved warping parameter to the partial teleimages; and generate the synthetic image based on the secondary warping results.

The initial warping parameter may be preset based on design data of the telephoto camera and the wide angle camera.

The one or more processor may be configured to: for the partitioning of the teleimages into partial teleimages, determine first partial teleimages by partitioning a first teleimage of the teleimages; and for the determining of the partial wide images, determine first partial wide images corresponding to the first partial teleimages from among the partial wide images based on an index of the subcells.

A number of the partial teleimages and a number of the partial wide images may be identical.

The one or more processor may be configured to: provide the wide image as a thumbnail image of the synthetic image before performing the feature matching and determining the warping parameter; and in response to a user input for magnifying the thumbnail image, provide a magnified portion of the synthetic image by partially executing the performing of the feature matching and the determining of the warping parameter for the magnified portion corresponding to the user input.

For the performing of the feature matching, the one or more processor may be configured to, in response to feature data according to a first feature matching result based on a first number of partitions being insufficient, obtain a second feature matching result by performing additional feature matching based on a second number of partitions that is greater than the first number of partitions.

The one or more processor may be configured to: perform the feature matching based on first partial teleimages of a first teleimage of the teleimages according to the first number of partitions; and in response to a first image of which features are not extracted, of the first partial teleimages, being determined in the feature matching when additional feature matching is performed based on second partial teleimages of the first teleimage according to the second number of partitions, perform additional feature matching while excluding a second image comprised in the first image of the second partial teleimages.

In another general aspect, an apparatus with image processing includes: one or more processors configured to: partition teleimages into partial teleimages, the teleimages corresponding to grid cells of a wide image; determine partial wide images corresponding to the partial teleimages based on subcells of the grid cells and the wide image; perform feature matching between the partial teleimages and the partial wide images; determine a warping parameter of the teleimages based on a result of the feature matching; and generate a synthetic image corresponding to the wide image by warping the teleimages based on the warping parameter.

For the performing of the feature matching, the one or more processor may be configured to: generate primary warping results by applying an initial warping parameter to the partial teleimages; and perform the feature matching between the primary warping results and the partial wide images.

The one or more processor may be configured to: for the determining of the warping parameter, determine an improved warping parameter of the teleimages according to a result of the feature matching based on the primary warping results; and for the generating of the synthetic image, generate secondary warping results by applying the improved warping parameter to the partial teleimages; and generate the synthetic image based on the secondary warping results.

The one or more processor may be configured to: provide the wide image as a thumbnail image of the synthetic image before performing the feature matching and determining the warping parameter; and in response to a user input for magnifying the thumbnail image, provide a magnified portion by partially performing the feature matching and determining the warping parameter for the magnified portion, corresponding to the user input, of the synthetic image.

For the performing of the feature matching, the one or more processor may be configured to, in response to feature data according to a first feature matching result based on a first number of partitions being insufficient, obtain a second feature matching result by additionally performing feature matching based on a second number of partitions that is greater than the first number of partitions.

The apparatus may include a memory storing instructions that, when executed by the one or more processors, configure the one or more processors to perform the partitioning of the teleimages, the determining of the partial wide images, the performing of the feature matching, the determining of the warping parameter, and the generating of the synthetic image.

In another general aspect, a processor-implemented method with image processing includes: partitioning teleimages into partial teleimages, the teleimages corresponding to grid cells of a wide image; determining partial wide images corresponding to the partial teleimages based on subcells of the grid cells and the wide image; performing feature matching between the partial teleimages and the partial wide images; determining a warping parameter of the teleimages based on a result of the feature matching; and generating a synthetic image corresponding to the wide image by warping the teleimages based on the warping parameter.

The performing of the feature matching may include: generating primary warping results by applying an initial warping parameter to the partial teleimages; and performing the feature matching between the primary warping results and the partial wide images.

The generating of the synthetic image may include: in response to an improved warping parameter of the teleimages according to a result of the feature matching based on the primary warping results being determined, generating secondary warping results by applying the improved warping parameter to the partial teleimages; and generating the synthetic image based on the secondary warping results.

The method may include: providing the wide image as a thumbnail image of the synthetic image before performing the feature matching and determining the warping parameter; and in response to a user input for magnifying the thumbnail image, providing a magnified portion of the synthetic image by partially executing the performing of the feature matching and the determining of the warping parameter for the magnified portion corresponding to the user input.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with image processing includes: generating a primary warping result of a teleimage based on a primary warping parameter, the teleimage being of teleimages corresponding to grid cell images of a wide image; partitioning the primary warping result into partial teleimages; partitioning a grid cell image of the grid cell images into partial wide images; determining an improved warping parameter based on a result of feature matching between the partial teleimages and the partial wide images; generating a secondary warping result of the teleimage based on the improved warping parameter; and generating a synthetic image corresponding to the wide image based on the secondary warping result.

The generating of the synthetic image may include generating the synthetic image by synthesizing at least a portion of the secondary warping result and a secondary warping result of another of the teleimages.

The determining of the improved warping parameter may include determining the improved warping parameter in response to a user input for magnifying the wide image to a grid cell image of the grid cell images corresponding to the teleimage.

The determining of the improved warping parameter may include: based on the result of the feature matching, repartitioning the primary warping result into a greater number of partial teleimages and repartitioning the grid cell image into a greater number of partial wide images; and determining the improved warping parameter based on a result of feature matching between the greater number of partial teleimages and the greater number of partial wide images.

Other features and aspects will be apparent from the following detailed description, the drawings, and the claims.

Figure 1A:
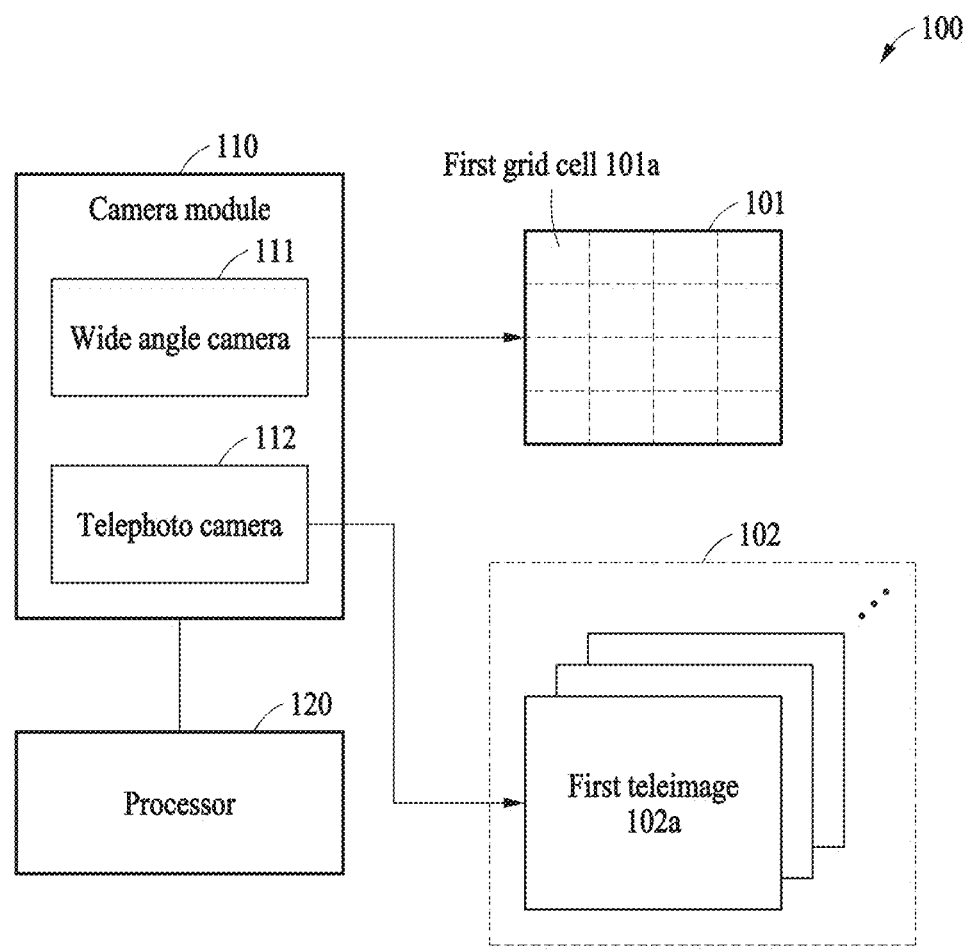
FIG. 1A illustrates an example of generating a wide image and a teleimage by an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, and/or components, but do not preclude the presence or addition of one or more other features, integers, steps, operations, elements, components and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1A illustrates an example of generating a wide image and a teleimage by an electronic device. Referring to FIG. 1A, an electronic device 100 may include a camera module 110 and a processor 120 (e.g., one or more processors). The camera module 110 may include a wide angle camera 111 and a telephoto camera 112. The wide angle camera 111 may generate a wide image 101 through a wide angle lens, and the telephoto camera 112 may generate teleimages 102 through a telephoto lens. The wide angle lens and the wide image 101 may have a wider field of view (FOV) compared to the telephoto lens and the teleimages 102.

When the wide image 101 is partitioned into grid cells, the teleimages 102 may correspond to the grid cells. For example, a first teleimage 102a may correspond to a first grid cell 101a. A number of generated teleimages 102 may correspond to or equal a number of grid cells into which the wide image 101 is partitioned. As a non-limiting example, when the wide image 101 is partitioned into 16 grid cells, 16 teleimages 102 may be generated. The telephoto camera 112 may generate the teleimages 102 by changing a capture direction according to preset directions based on a relationship between a capture area of the telephoto camera 112 and a capture area of the wide angle camera 111.

Figure 1B:
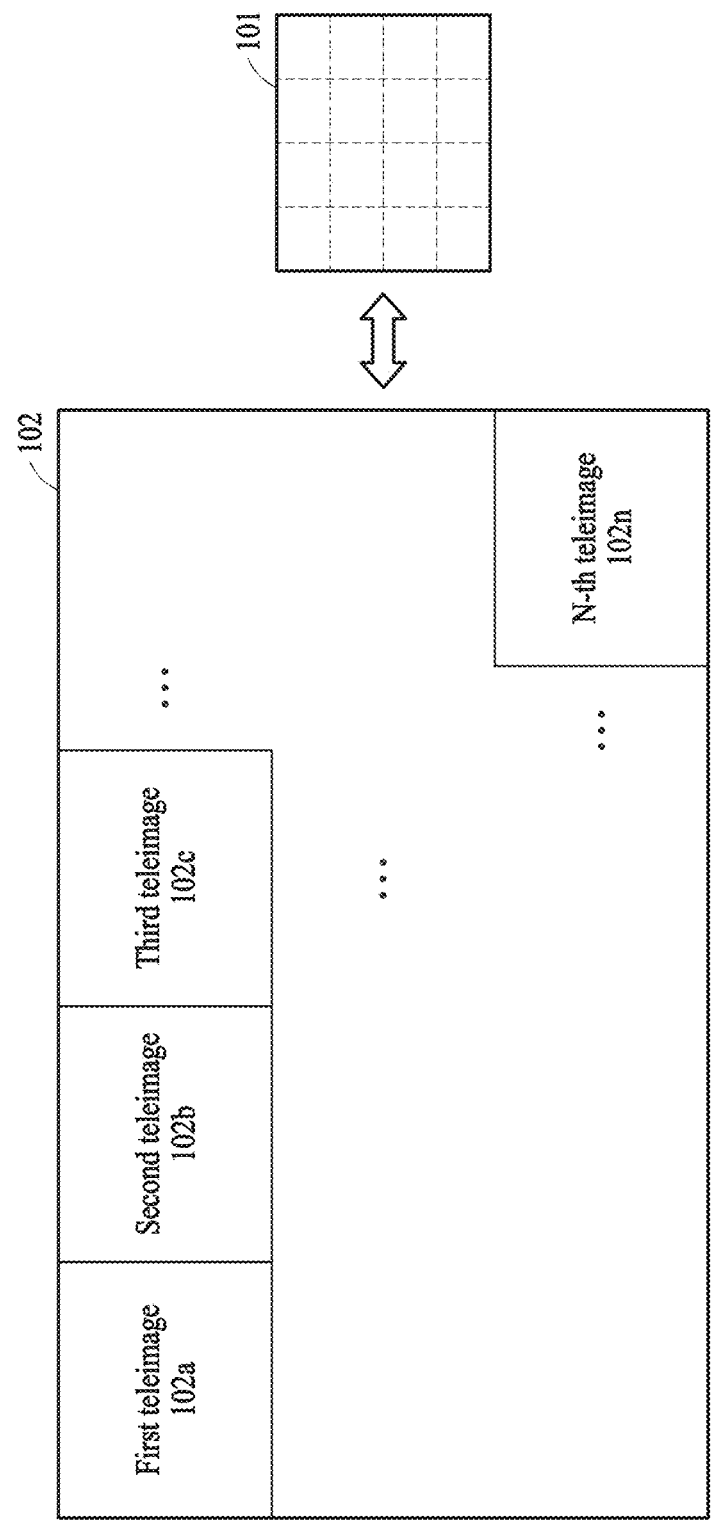
FIG. 1B illustrates an example of a relationship between a wide image and a teleimage.

The telephoto camera 112 may include a configuration and/or a structure that may change a capture direction. For example, the telephoto camera 112 may include a capture direction controller at a front of a lens group. The capture direction controller may include a first reflector (for example, a prism) that is rotatable on a horizontal axis, a second reflector (for example, a prism) that is rotatable on a vertical axis, and an actuator that causes either one or both of the first reflector and the second reflector to rotate (e.g., an actuator configured to rotate either one or both of the first reflector and the second reflector). The telephoto camera 112 may change a capture direction by rotating either one or both of the first and second reflectors using the actuator. FIG. 1B illustrates an example of a relationship between a wide image and a teleimage. Referring to FIG. 1B, the teleimages 102 may include a first to n-th of teleimages 102a to 102n. n may represent a number of the teleimages 102 and a number of grid cells into which the wide image 101 is partitioned.

Referring to FIG. 1A, the processor 120 may generate a synthetic image corresponding to the wide image 101 by stitching the teleimages 102. When the wide image 101 has a similar image quality to the teleimages 102, the synthetic image may correspond to a high-definition version of the wide image 101. The processor 120 may determine a common feature between the teleimages 102 using feature matching. The processor 120 may perform image warping and/or image synthesis based on the common feature. The processor 120 may partition the teleimages 102 and the grid cells into smaller units and may detect more common features in a wider area by performing feature matching using the smaller units. Through this process, the electronic device 100 of one or more embodiments may more naturally synthesize the teleimages 102 with each other, and the electronic device 100 of one or more embodiments may more accurately match the synthetic image and the wide image 101, compared to a typical electronic device.

Figure 2:
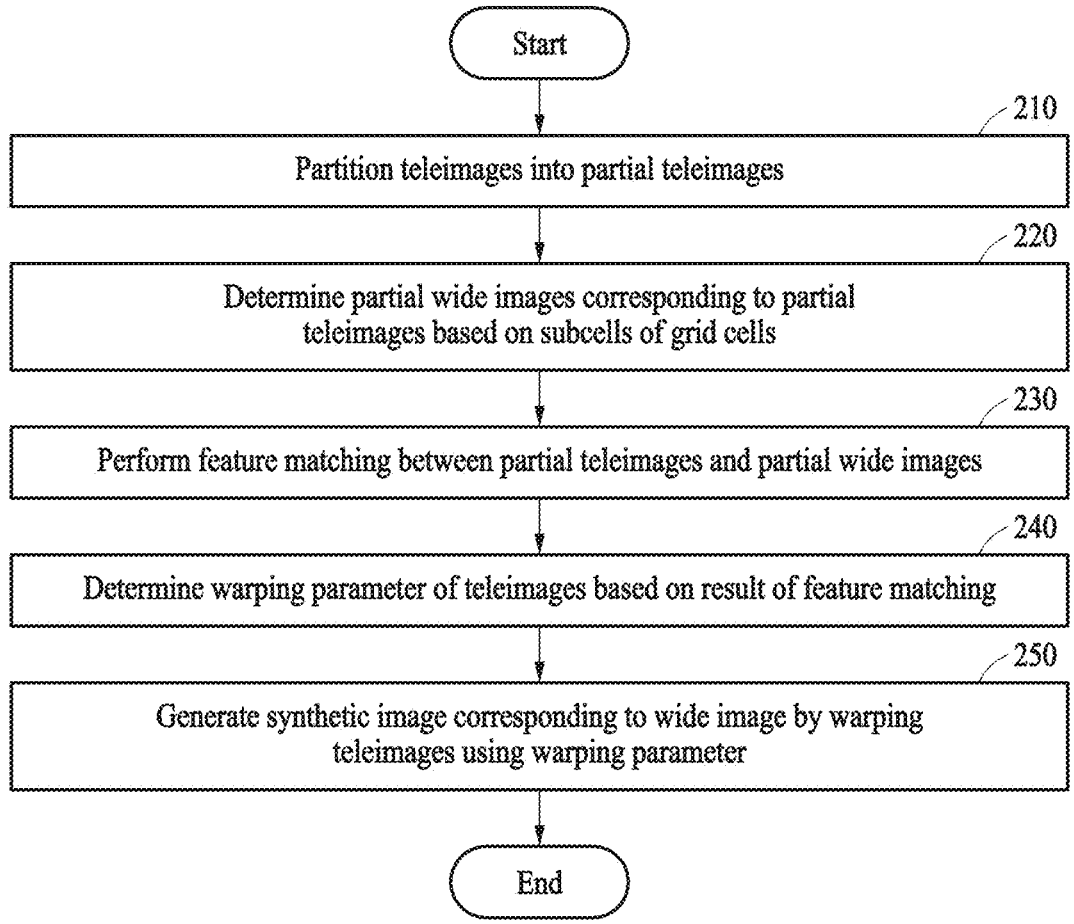
FIG. 2 illustrates an example of an image processing method using image synthesis based on feature matching.

FIG. 2 illustrates an example of an image processing method using image synthesis based on feature matching. Operations 210 to 250 of FIG. 2 may be performed sequentially or non-sequentially. For example, the order of operations 210 to 250 may be changed, and/or at least two of operations 210 to 250 may be performed in parallel. Operations 210 to 250 may be performed by an image processing apparatus (for example, an image processing apparatus 800). An electronic device (for example, the electronic device 100 and/or an electronic device 900) may be or include the image processing apparatus.

Referring to FIG. 2, in operation 210, the image processing apparatus may partition teleimages into partial teleimages. The image processing apparatus may equally partition the teleimages into a predetermined number of partitions. As non-limiting examples, the predetermined number of partitions may be 4, 6, or 9.

In operation 220, the image processing apparatus may determine partial wide images corresponding to the partial teleimages based on subcells of grid cells. The image processing apparatus may partition a wide image corresponding to partitions of the teleimages. The image processing apparatus may partition the grid cells into the subcells based on the predetermined number of partitions. The image processing apparatus may equally partition the grid cells into the predetermined number of partitions. The image processing apparatus may determine the partial wide images corresponding to the subcells. Accordingly, a number of the partial wide images may be determined to be the same as a number of the partial teleimages. The image processing apparatus may assign an index to each of the subcells and may detect a subcell corresponding to the partial wide image using the index.

In operation 230, the image processing apparatus may perform feature matching between the partial teleimages and the partial wide images. The image processing apparatus may extract features from the partial teleimages and the partial wide images and may perform feature matching by comparing the extracted features. In operation 240, the image processing apparatus may determine a warping parameter of the teleimages based on a result of feature matching. In operation 250, the image processing apparatus may generate a synthetic (e.g., stitched or segmented panoramic) image corresponding to the wide image by warping the teleimages using the warping parameter.

The telephoto camera may generate the teleimages by changing a capture direction according to preset directions based on a relationship between a capture region (or, capture view) of the telephoto camera and a capture region of the wide angle camera. When the wide image has one capture direction and the teleimages have different capture directions, the teleimages may have warping features based on capture directions in the relationship with the wide image. The teleimages may be more sophisticatedly matched to the wide image by alleviating a warping state of the teleimages based on the warping features. The warping state may be adjusted by a warping parameter. For example, the warping parameter may include a homography between images. The image processing apparatus may perform image warping between the teleimages by or based on the warping parameter. The image warping may match pixel coordinates of an original image to pixel coordinates of a target image through geometric transformation. For example, in response to two images of a same scene being captured from different capturing angles, the two images may be converted into a corresponding image by image warping. In response to a predetermined condition (for example, having no occlusion and/or placement near to capture cameras) being satisfied, two images may be converted into a same image by image warping.

The image processing apparatus may perform feature matching between original partial teleimages and partial wide images, and may determine a warping parameter of teleimages based on a result of feature matching. Further, the image processing apparatus may obtain primary warping results of original teleimages based on a primary warping parameter, may perform feature matching between the partial wide images and the partial teleimages of the primary warping results, and may determine a secondary warping parameter of the teleimages based on a result of feature matching. The primary warping parameter may correspond to a temporary warping parameter or an initial warping parameter, and the secondary warping parameter may correspond to a final warping parameter or an improved warping parameter.

A preset primary warping parameter preset based on design data (e.g., configuration data) of the telephoto camera and the wide angle camera may be used. For example, the design data may include any one or any combination of any two or more of camera specifications (for example, a camera parameter and/or lens specifications) of the telephoto camera and the wide angle camera, a relationship between a capture direction of the telephoto camera and a capture direction of the wide angle camera, and a relationship between a capture area of the telephoto camera and a capture area of the wide angle camera.

When an actual capture is different from a prediction based on the design data, an error may occur between an actual warping state and a primary warping result based on a capture factor (for example, autofocusing) of the actual capture. However, the image processing apparatus of one or more embodiments may generate an improved matching result by using the primary warping result rather than using the original teleimage. In addition, the image processing apparatus may generate a secondary warping result which is closer to the actual warping state based on a feature matching result obtained by the primary warping result. Specifically, the image processing apparatus of one or more embodiments may determine a secondary warping parameter of the teleimages according to the feature matching result based on primary warping results, may generate secondary warping results by applying the secondary warping parameter to the partial teleimages, and may generate an improved synthetic image based on the secondary warping results.

The synthetic image may correspond to a high-definition version of the wide image. In response to the teleimages being provided, the image processing apparatus may immediately generate an entire synthetic image, or may sequentially generate necessary or determined parts in the synthetic image. Since the latter uses less computing resources, the latter may be used in an environment with limited computing resources. For example, the synthetic image may be provided as a magnified image of the wide image. The image processing apparatus may provide the wide image as a thumbnail image of the synthetic image before the feature matching of operation 230 and the determining a warping parameter of operation 240. In addition, in response to a user input for magnifying the thumbnail image, the image processing apparatus of one or more embodiments may provide the corresponding magnified area of the synthetic image by partially executing operation 230 and operation 240 for the magnified area corresponding to the user input, thereby advantageously using less computing resources than when generating the entire synthetic image. In response to a change in the magnified area or zooming in another portion of the thumbnail image by the user, the image processing apparatus may provide a corresponding magnified area of the synthetic image by identifying the magnified area depending on a situation.

Figure 3:
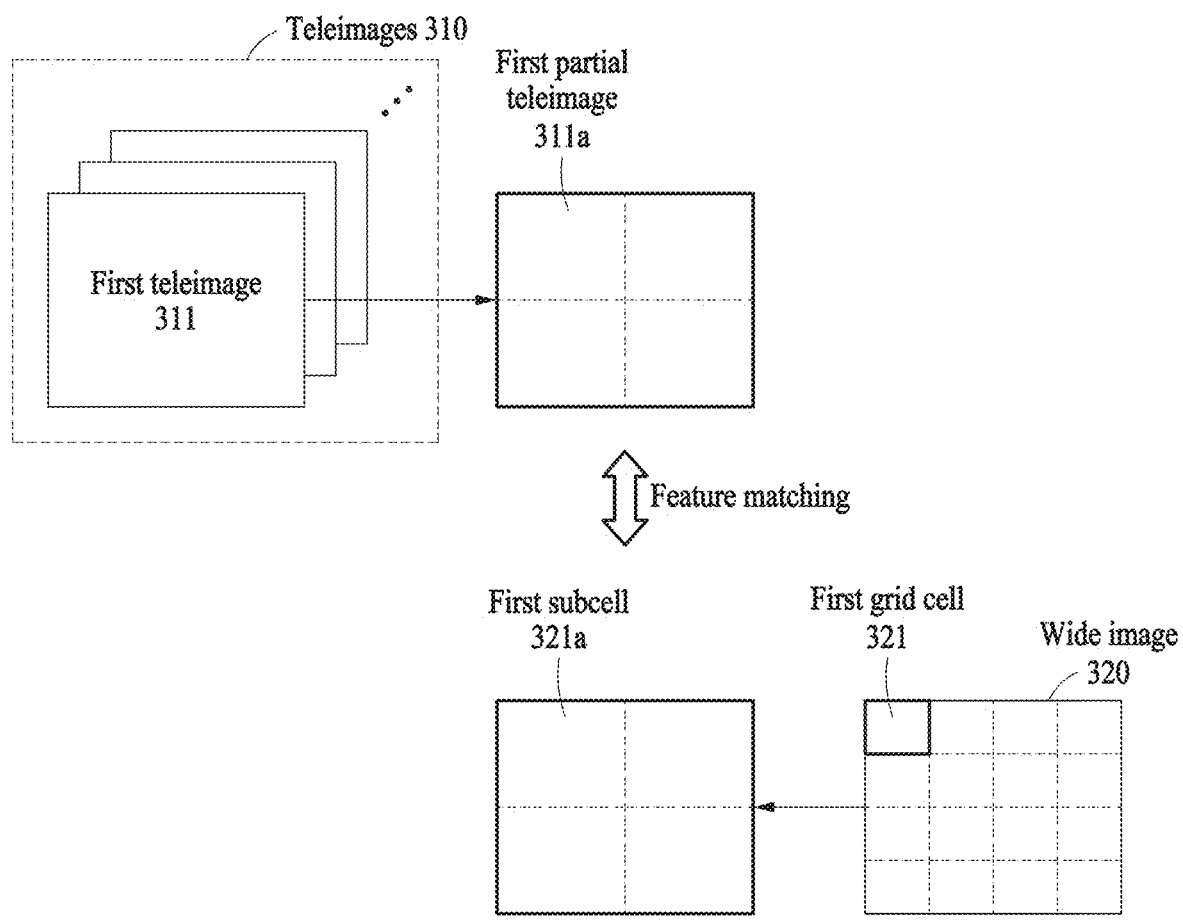
FIG. 3 illustrates an example of a process of feature matching using image partitioning.

FIG. 3 illustrates an example of a process of feature matching using image partitioning. Referring to FIG. 3, teleimages 310 may be partitioned into partial teleimages respectively. For example, a first teleimage 311 of the teleimages 310 may be partitioned into the partial teleimages including a first partial teleimage 311a. While FIG. 3 describes a case in which a number of partitions is four, this only a non-limiting example and any of different numbers of partitions may be used according to other non-limiting examples (e.g., less than four or more than four). Grid cells of a wide image 320 may be partitioned into subcells. For example, a first grid cell 321 of the grid cells of the wide image 320 may be partitioned into the subcells including a first subcell 321a. A portion of the wide image 320 corresponding to a grid cell may be referred to as a grid cell image, and a portion corresponding to a subcell may be referred to as a subcell image or a partial wide image. The image processing apparatus may perform feature matching between the partial teleimages and the partial wide images. For example, the image processing apparatus may perform feature matching between corresponding image pairs such as the first partial teleimage 311a and the first subcell 321a.

Figure 4:
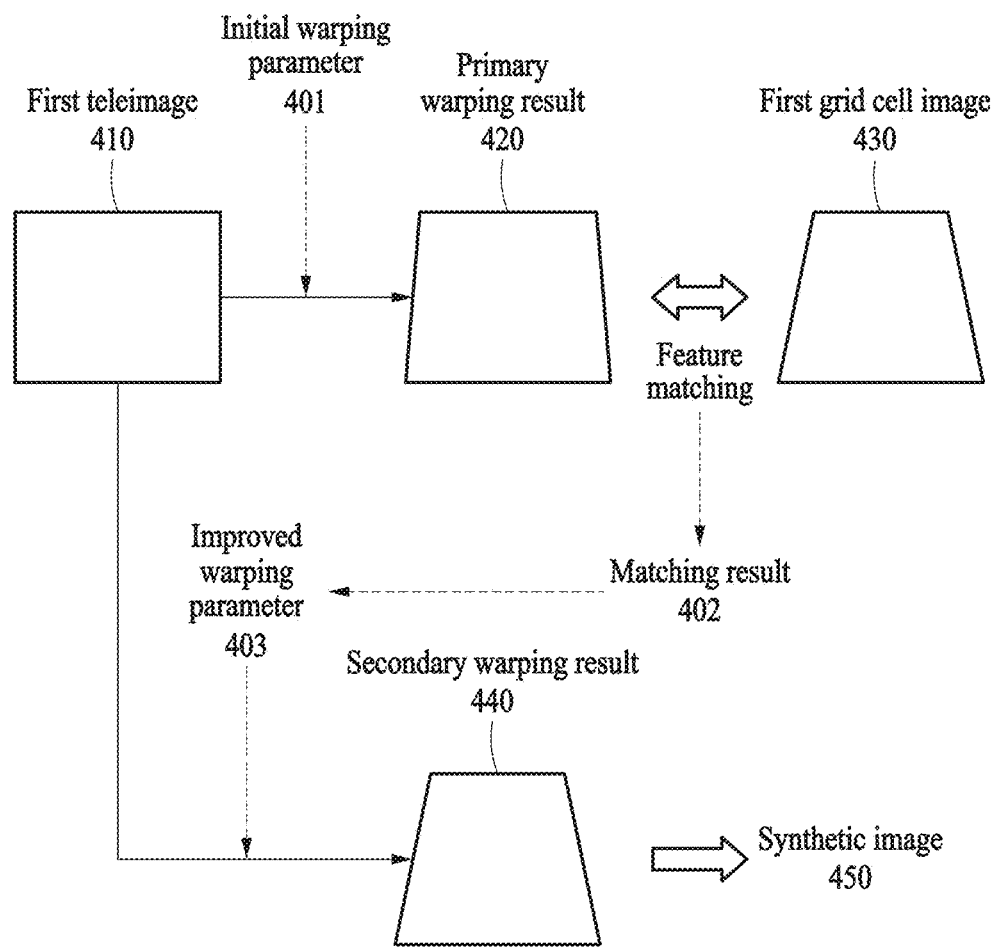
FIG. 4 illustrates an example of a process of feature matching using an initial warping parameter.

FIG. 4 illustrates an example of a process of feature matching using an initial warping parameter. Referring to FIG. 4, an image processing apparatus may generate primary warping result 420 (e.g., a primary or first warped image) corresponding to a first teleimage 410 based on a primary warping parameter 401. The image processing apparatus may perform feature matching between the primary warping result 420 and a first grid cell image 430. In this case, the image processing apparatus may partition the first (e.g., the primary) warping result 420 into partial teleimages, may partition the first grid cell image 430 into partial wide images, and may match features between the partial teleimages and the partial wide images. The image processing apparatus may determine an improved warping parameter 403 based on a matching result 402. The image processing apparatus may generate a secondary warping result 440 corresponding to the first teleimage 410 based on the first teleimage 410 and the improved warping parameter 403. The secondary warping result 440 may conform more (or better conform) to an actual warping state of the first grid cell image 430 compared to the primary warping result 420. The image processing apparatus may generate a synthetic image 450 by synthesizing at least a portion of the secondary warping result 440 of the first teleimage 410 and secondary warping results of other teleimages.

Figure 5:
FIG. 5 illustrates an example of a wide image and a teleimage.
Figure 5:
Figure 5:
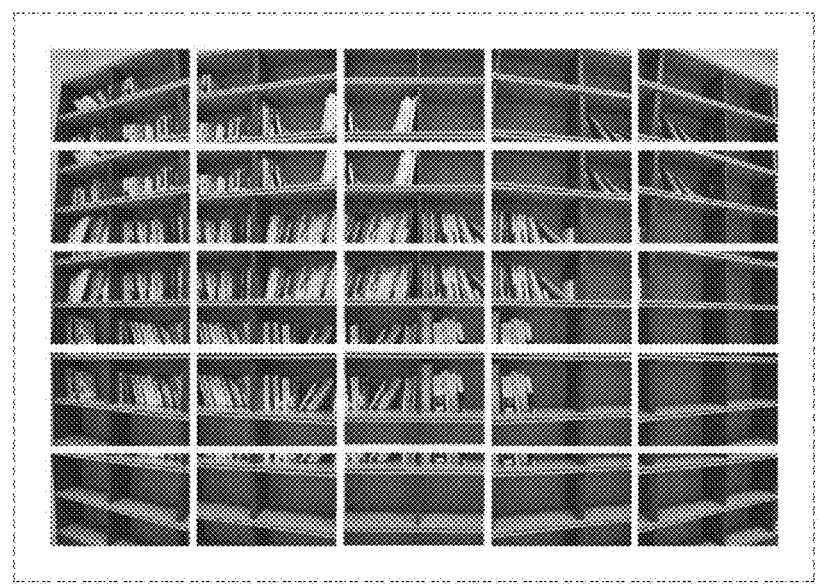

FIG. 5 illustrates an example of a wide image and a teleimage. Referring to FIG. 5, a wide image 510 and teleimages 520 may be generated by a same scene being respectively captured by a wide angle camera and a telephoto camera. The teleimages 520 may correspond to an original image and may show a warping feature depending on a capture direction. The warping feature of the teleimages 520 may be alleviated to generate a synthetic image close (or better conforming) to the wide image 510. The warping feature may be alleviated (e.g., reduced or removed) by the warping parameter. The warping parameter may include an initial warping parameter and an improved warping parameter.

Figure 6A:
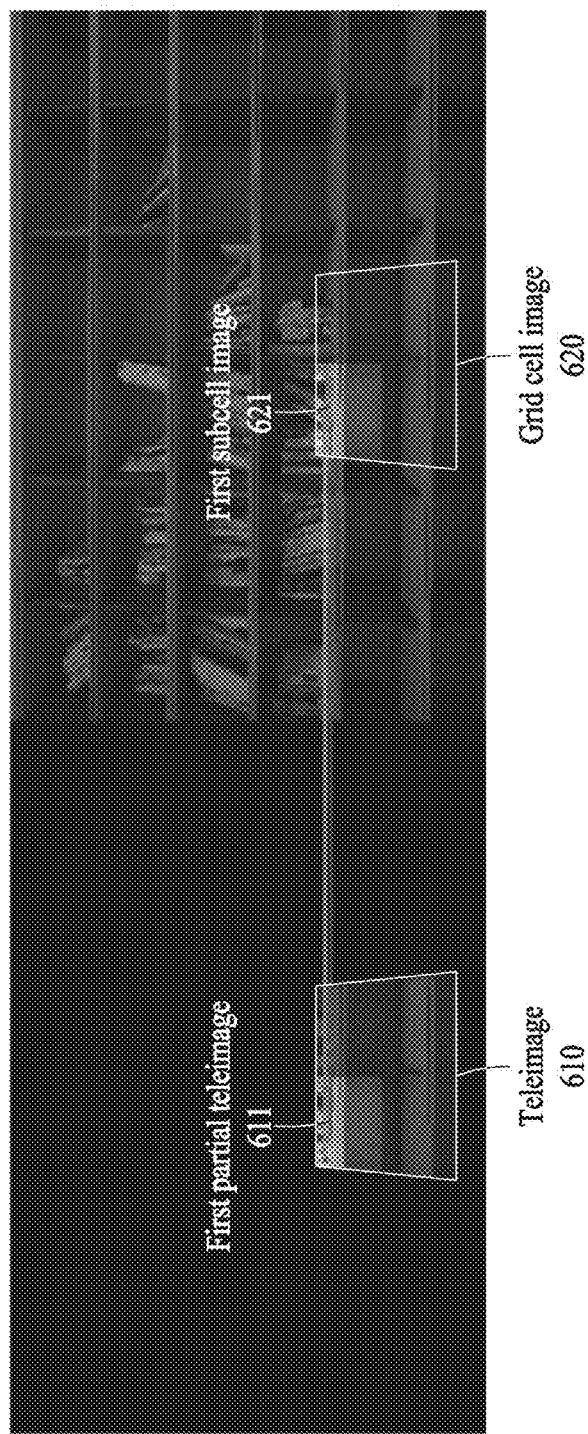
FIGS. 6A to 6C illustrate examples of feature matching using image partitioning.
Figure 6B:
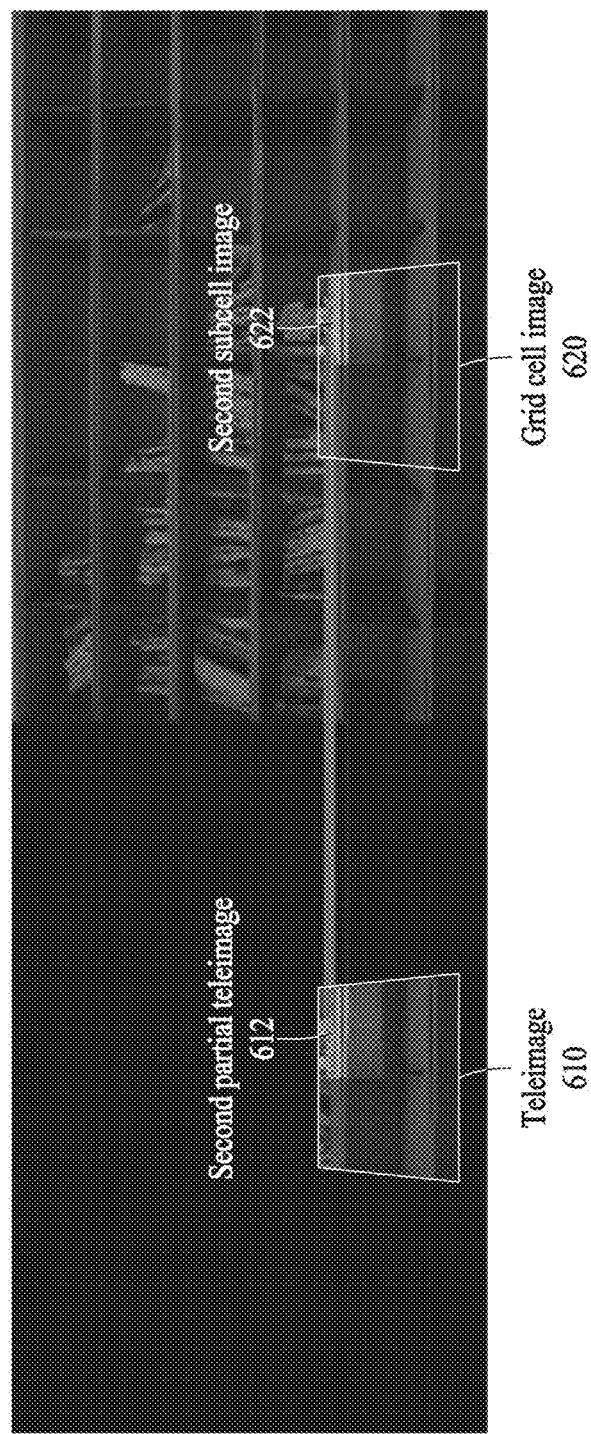
Figure 6C:
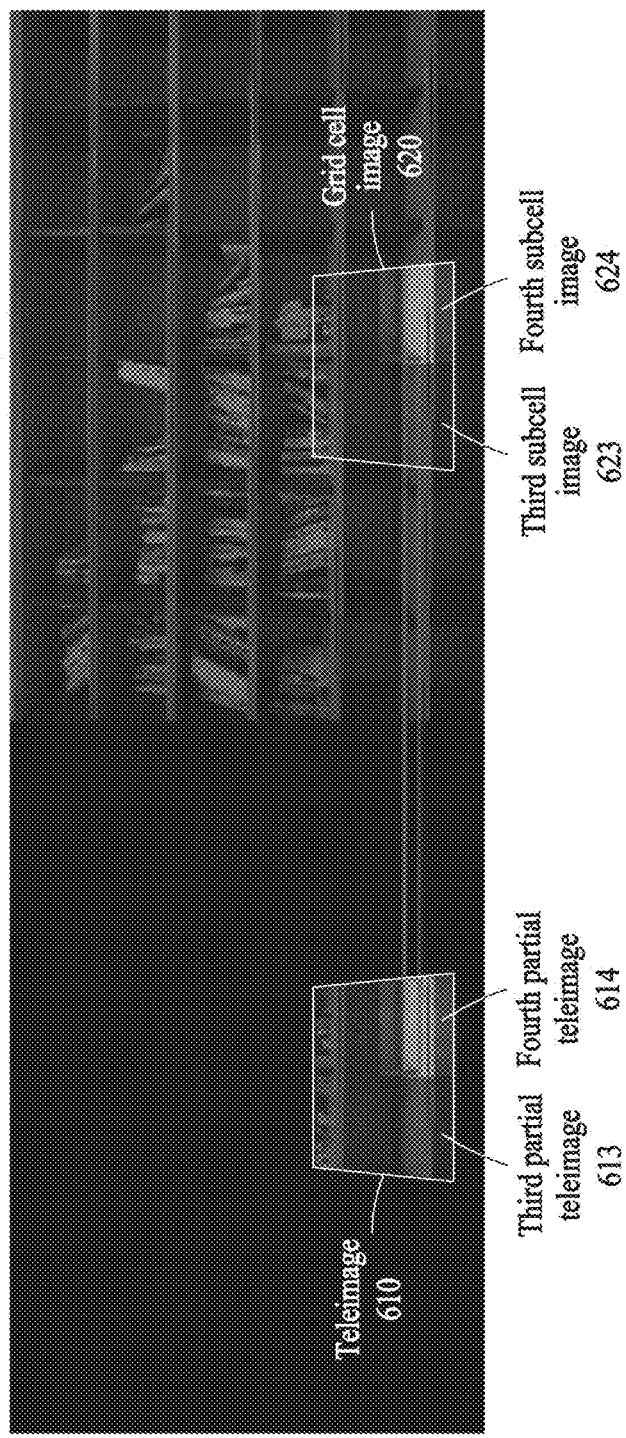

FIGS. 6A to 6C illustrate examples of feature matching using image partitioning. By segmenting an image area in feature matching, more common features may be matched in a wider area. FIGS. 6A to 6C may represent feature matching between a teleimage 610 and a grid cell image 620. FIG. 6A may represent feature matching between a first partial teleimage 611 of the teleimage 610 and a first subcell 621 of the grid cell image 620, FIG. 6B may represent feature matching between a second partial teleimage 612 and a second subcell image 622, and FIG. 6C may represent feature matching between a fourth partial teleimage 614 and a fourth subcell 624. When a corresponding or matching feature is not detected in a third partial teleimage 613 and a third subcell 623, by performing feature extraction by comparing the teleimage 610 and the grid cell image 620 overall, a typical image processing apparatus may not perform (or may not accurately perform) matching in a lower area of the teleimage 610 and the grid cell image 620. In contrast, by performing feature extraction in a partitioned state as shown in FIGS. 6A to 6C, the image processing apparatus of one or more embodiments may improve a matching state by feature matching between the fourth partial teleimage 614 and the fourth subcell 624.

Figure 7:
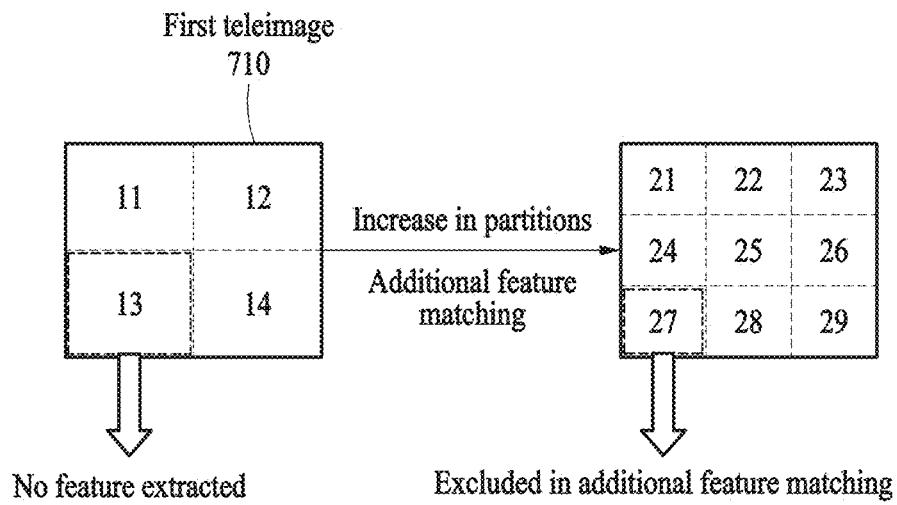
FIG. 7 illustrates an example of an operation of adjusting a number of partitions.

FIG. 7 illustrates an example of an operation of adjusting a number of partitions. An image processing apparatus may partition a teleimage and a grid cell image based on a number of partitions. In this case, the image processing apparatus may fix the number of partitions or may adjust the number of partitions depending on a situation. In response to a large number of partitions, a matching state may be improved; however, an amount of computation may increase. The image processing apparatus may appropriately adjust a number of partitions based on a quantity of feature data obtained by feature matching. For example, the image processing apparatus may determine whether the feature data is sufficient based on a distribution and/or a number of feature pairs. In response to insufficient feature data as a result of feature matching based on a predetermined number of partitions (for example, a first number of partitions), the image processing apparatus may perform additional feature matching based on a number of partitions (for example, a second number of partitions) which is larger than the predetermined number of partitions. As a result of additional feature matching, more features of a wider area may be included.

When a larger number of partitions is used, the image processing apparatus may extract features while excluding an image area in which a feature may be less likely to be detected. For example, the image processing apparatus may perform feature matching based on the first partial teleimages of the first teleimage of the teleimages according to the first number of partitions. In addition, when a first image of which features are not extracted, of the first partial teleimages, is found in feature matching when additional feature matching is performed based on second partial teleimages of the first teleimage according to the second number of partitions, additional feature matching may be performed while a second image included in the first image of the second partial teleimages is excluded.

For example, referring to FIG. 7, the image processing apparatus may perform feature matching based on areas 11 to 14 by partitioning the first teleimage 710 into four partitions. When feature data obtained based on the four partitions is not sufficient, the image processing apparatus may perform feature matching based on areas 21 to 29 by partitioning the first teleimage 710 into nine by increasing a number of partitions. When no feature is extracted from the area 13 in feature matching based on the four partitions, the image processing apparatus may perform feature matching while excluding the area 27 included in the area 13 during feature matching based on the nine partitions. The exclusion process of one or more embodiments may reduce an amount of computation due to an increase in a number of partitions and may enhance a matching operation efficiency.

Figure 8:
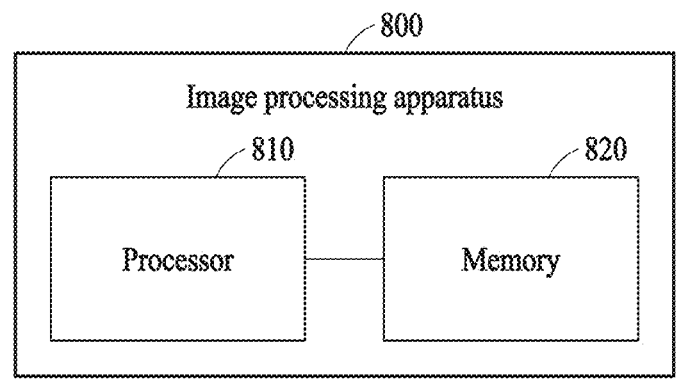
FIG. 8 illustrates an example of a configuration of an image processing apparatus.

FIG. 8 illustrates an example of a configuration of an image processing apparatus. Referring to FIG. 8, an image processing apparatus 800 may include a processor 810 (e.g., one or more processors) and a memory 820 (e.g., one or more memories). The memory 820 may be connected to the processor 810 and store instructions executable by the processor 810, data to be computed by the processor 810, or data processed by the processor 810. The memory 820 may include a non-transitory computer-readable medium, for example, a high-speed random access memory (RAM) and/or nonvolatile computer-readable medium (e.g., any one or any combination of any two or more of a disk storage device, a flash memory device, and another nonvolatile solid-state memory device). The memory 820 may be a non-transitory computer-readable storage medium storing instructions that, when executed by the processor 810, configure the processor 810 to perform any one, any combination of any two or more, or all of the operations and methods described herein with reference to FIGS. 1 to 7 and 9.

The processor 810 may execute the instructions to perform any one, any combination of any two or more, or all of the operations and methods described herein with reference to FIGS. 1 to 7 and 9. For example, in response to a wide image and teleimages being generated by a camera module, the processor 810 may partition the teleimages into partial teleimages, may determine partial wide images corresponding to the partial teleimages based on subcells of grid cells, may perform feature matching between the partial teleimages and the partial wide images, may determine a warping parameter of the teleimages based on a result of feature matching, and may generate a synthetic image corresponding to the wide image by warping the teleimages by the warping parameter. In addition, the description provided with reference to FIGS. 1 to 7, and 9 may apply to the image processing apparatus 800.

Figure 9:
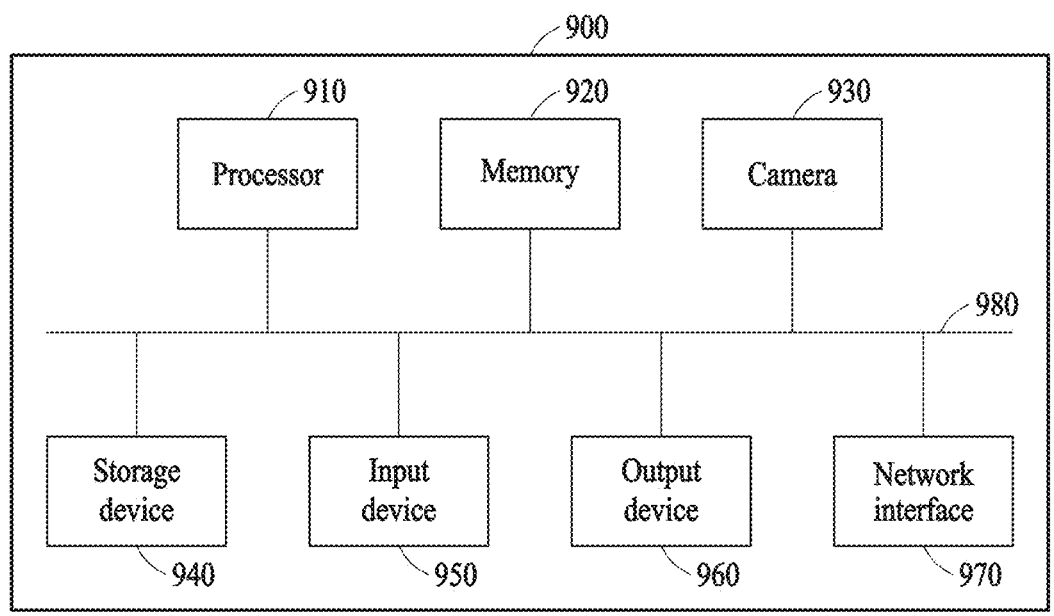
FIG. 9 illustrates an example of a configuration of an electronic device.

FIG. 9 illustrates an example of a configuration of an electronic device. Referring to FIG. 9, the electronic apparatus 900 may include a processor 910 (e.g., one or more processors), a memory 920 (e.g., one or more memories), a camera 930, a storage device 940, an input device 950, an output device 960, and a network interface 970. The processor 910, the memory 920, the camera 930, the storage device 940, the input device 950, the output device 960, and the network interface 970 may communicate with each other via a communication bus 980. For example, the electronic device 900 may be implemented as at least a portion of, for example, a mobile device such as a mobile phone, a smart phone, a personal digital assistant (PDA), a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock or a closed-circuit television (CCTV), a vehicle such as an autonomous vehicle, a smart vehicle, and a robot such as a drone. The electronic device 900 may be or include the electronic device 100 of FIG. 1 and/or the image processing apparatus 800 of FIG. 8.

The processor 910 may execute instructions and functions in the electronic apparatus 900. For example, the processor 910 may process instructions stored in the memory 920 or the storage device 940. The processor 910 may perform the operations described through FIGS. 1 to 8. The memory 920 may include a non-transitory computer-readable storage medium or a non-transitory computer-readable storage device. The memory 920 may store instructions that are to be executed by the processor 910, and also store information associated with software and/or applications when the software and/or applications are being executed by the electronic apparatus 900.

The camera 930 may capture a photo and/or a video. For example, the camera 930 may correspond to a camera module including a wide angle camera and a telephoto camera. The storage device 940 may include a non-transitory computer-readable storage medium or a non-transitory computer-readable storage device. The storage device 940 may store a greater amount of information than the memory 920 and store the information for a long period of time. For example, the storage device 940 may be a magnetic hard disk, optical disk, flash memory, floppy disk, or other form of non-volatile memory known in the art.

The input device 950 may receive an input from a user through a traditional input scheme using a keyboard and a mouse, and through a new input scheme such as a touch input, a voice input and an image input. For example, the input device 950 may detect an input from a keyboard, a mouse, a touchscreen, a microphone or a user, and may be any other device configured to transfer the detected input to the electronic apparatus 900. The output device 960 may provide a user with an output of the electronic apparatus 900 through a visual channel, an auditory channel, or a tactile channel. The output device 960 may be, for example, a display, a touchscreen, a speaker, a vibration generator, or any other device configured to provide a user with the output. The network interface 970 may communicate with an external device via a wired or wireless network.

The electronic devices, camera modules, wide angle cameras, telephoto cameras, processors, image processing apparatuses, memories, electronic apparatuses, cameras, storage devices, input devices, output devices, network interfaces, communication buses, electronic device 100, camera module 110, wide angle camera 111, telephoto camera 112, processor 120, image processing apparatus 800, processor 810, memory 820, electronic apparatus 900, processor 910, memory 920, camera 930, storage device 940, input device 950, output device 960, network interface 970, communication bus 980, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An electronic device comprising:
   a camera module comprising a wide angle camera configured to generate a wide image and a telephoto camera configured to generate teleimages corresponding to grid cells of the wide image; and
   one or more processors configured to:
     partition the teleimages into partial teleimages;
     determine partial wide images corresponding to the partial teleimages based on subcells of the grid cells and the wide image;

perform feature matching between the partial wide images and primary warping results of the partial teleimages generated based on a preset initial warping parameter;
determine an improved warping parameter of the teleimages based on a result of the feature matching; and
generate a synthetic image corresponding to the wide image by warping the teleimages based on the improved warping parameter.

2. The electronic device of claim 1, wherein, for the generating of the teleimages, the telephoto camera is configured to generate the teleimages by changing a capture direction according to preset directions based on a relationship between a capture area of the telephoto camera and a capture area of the wide angle camera.

3. The electronic device of claim 1, wherein, for the performing of the feature matching, the one or more processor are configured to:
generate the primary warping results by applying the initial warping parameter to the partial teleimages; and
perform the feature matching between the primary warping results and the partial wide images.

4. The electronic device of claim 3, wherein the one or more processor are configured to:
for the determining of the improved warping parameter, determine the improved warping parameter of the teleimages according to a result of the feature matching based on the primary warping results; and
for the generating of the synthetic image,
generate secondary warping results by applying the improved warping parameter to the partial teleimages; and
generate the synthetic image based on the secondary warping results.

5. The electronic device of claim 3, wherein the initial warping parameter is preset based on design data of the telephoto camera and the wide angle camera.

6. The electronic device of claim 1, wherein the one or more processor are configured to:
for the partitioning of the teleimages into partial teleimages, determine first partial teleimages by partitioning a first teleimage of the teleimages; and
for the determining of the partial wide images, determine first partial wide images corresponding to the first partial teleimages from among the partial wide images based on an index of the subcells.

7. The electronic device of claim 1, wherein a number of the partial teleimages and a number of the partial wide images are identical.

8. The electronic device of claim 1, wherein the one or more processor are configured to:
provide the wide image as a thumbnail image of the synthetic image before performing the feature matching and determining the improved warping parameter; and
in response to a user input for magnifying the thumbnail image, provide a magnified portion of the synthetic image by partially executing the performing of the feature matching and the determining of the improved warping parameter for the magnified portion corresponding to the user input.

9. The electronic device of claim 1, wherein, for the performing of the feature matching, the one or more processor are configured to, in response to feature data according to a first feature matching result based on a first number of partitions being insufficient, obtain a second feature matching result by performing additional feature matching based on a second number of partitions that is greater than the first number of partitions.

10. The electronic device of claim 9, wherein the one or more processor are configured to:
perform the feature matching based on first partial teleimages of a first teleimage of the teleimages according to the first number of partitions; and
in response to a first image of which features are not extracted, of the first partial teleimages, being determined in the feature matching when additional feature matching is performed based on second partial teleimages of the first teleimage according to the second number of partitions, perform additional feature matching while excluding a second image comprised in the first image of the second partial teleimages.

11. An apparatus with image processing, the apparatus comprising:
one or more processors configured to:
partition teleimages into partial teleimages, the teleimages corresponding to grid cells of a wide image;
determine partial wide images corresponding to the partial teleimages based on subcells of the grid cells and the wide image;
perform feature matching between the partial wide images and primary warping results of the partial teleimages generated based on a preset initial warping parameter;
determine an improved warping parameter of the teleimages based on a result of the feature matching; and
generate a synthetic image corresponding to the wide image by warping the teleimages based on the improved warping parameter.

12. The apparatus of claim 11, wherein, for the performing of the feature matching, the one or more processor are configured to:
generate the primary warping results by applying the initial warping parameter to the partial teleimages; and
perform the feature matching between the primary warping results and the partial wide images.

13. The apparatus of claim 12, wherein the one or more processor are configured to:
for the determining of the improved warping parameter, determine the improved warping parameter of the teleimages according to a result of the feature matching based on the primary warping results; and
for the generating of the synthetic image,
generate secondary warping results by applying the improved warping parameter to the partial teleimages; and
generate the synthetic image based on the secondary warping results.

14. The apparatus of claim 11, wherein the one or more processor are configured to:
provide the wide image as a thumbnail image of the synthetic image before performing the feature matching and determining the improved warping parameter; and
in response to a user input for magnifying the thumbnail image, provide a magnified portion by partially performing the feature matching and determining the improved warping parameter for the magnified portion, corresponding to the user input, of the synthetic image.

15. The apparatus of claim 11, wherein, for the performing of the feature matching, the one or more processor are configured to, in response to feature data according to a first feature matching result based on a first number of partitions being insufficient, obtain a second feature matching result by additionally performing feature matching based on a second number of partitions that is greater than the first number of partitions.

16. The apparatus of claim 11, further comprising a memory storing instructions that, when executed by the one or more processors, configure the one or more processors to perform the partitioning of the teleimages, the determining of the partial wide images, the performing of the feature matching, the determining of the improved warping parameter, and the generating of the synthetic image.

17. A processor-implemented method with image processing, the method comprising:
- partitioning teleimages into partial teleimages, the teleimages corresponding to grid cells of a wide image;
- determining partial wide images corresponding to the partial teleimages based on subcells of the grid cells and the wide image;
- performing feature matching between the partial wide images and primary warping results of the partial teleimages generated based on a preset initial warping parameter;
- determining an improved warping parameter of the teleimages based on a result of the feature matching; and
- generating a synthetic image corresponding to the wide image by warping the teleimages based on the improved warping parameter.

18. The method of claim 17, wherein the performing of the feature matching comprises:
- generating the primary warping results by applying the initial warping parameter to the partial teleimages; and
- performing the feature matching between the primary warping results and the partial wide images.

19. The method of claim 18, wherein the generating of the synthetic image comprises:
- in response to the improved warping parameter of the teleimages according to a result of the feature matching based on the primary warping results being determined, generating secondary warping results by applying the improved warping parameter to the partial teleimages; and
- generating the synthetic image based on the secondary warping results.

20. The method of claim 17, further comprising:
- providing the wide image as a thumbnail image of the synthetic image before performing the feature matching and determining the improved warping parameter; and
- in response to a user input for magnifying the thumbnail image, providing a magnified portion of the synthetic image by partially executing the performing of the feature matching and the determining of the improved warping parameter for the magnified portion corresponding to the user input.

21. A non-transitory computer-readable storage medium storing instructions that, when executed by one or more processors, configure the one or more processors to perform the method of claim 17.

22. A processor-implemented method with image processing, the method comprising:
- generating a primary warping result of a teleimage based on a primary warping parameter, the teleimage being of teleimages corresponding to grid cell images of a wide image;
- partitioning the primary warping result into partial teleimages;
- partitioning a grid cell image of the grid cell images into partial wide images;
- determining an improved warping parameter based on a result of feature matching between the partial wide images and primary warping results of the partial teleimages generated based on a preset initial warping parameter;
- generating a secondary warping result of the teleimage based on the improved warping parameter; and
- generating a synthetic image corresponding to the wide image based on the secondary warping result.

23. The method of claim 22, wherein the generating of the synthetic image comprises generating the synthetic image by synthesizing at least a portion of the secondary warping result and a secondary warping result of another of the teleimages.

24. The method of claim 22, wherein the determining of the improved warping parameter comprises determining the improved warping parameter in response to a user input for magnifying the wide image to a grid cell image of the grid cell images corresponding to the teleimage.

25. The method of claim 22, wherein the determining of the improved warping parameter comprises:
- based on the result of the feature matching, repartitioning the primary warping result into a greater number of partial teleimages and repartitioning the grid cell image into a greater number of partial wide images; and
- determining the improved warping parameter based on a result of feature matching between the greater number of partial teleimages and the greater number of partial wide images.

* * * * *